United States Patent Office 3,489,805
Patented Jan. 13, 1970

3,489,805
2,3-DIHALOPHENYL-3-IODOPROPARGYL ETHERS
Jay Philip O'Brien, Irvington, and Albert Israel Rachlin, Verona, N.J., assignors to Hoffmann-La Roche Inc., Nutley, N.J., a corporation of New Jersey
No Drawing. Continuation-in-part of application Ser. No. 433,209, Feb. 16, 1965. This application Sept. 8, 1965, Ser. No. 485,904
Int. Cl. C07c 79/34
U.S. Cl. 260—612                                      1 Claim

ABSTRACT OF THE DISCLOSURE

Antimicrobial 2,3 - dichlorophenyl - 3 - iodopropargyl ethers are prepared inter alia by condensing a 2,3-dichlorophenol with a 3-halopropyne followed by iodination.

Cross reference to related applications

This application is a continuation-in-part of Ser. No. 433,209, O'Brien et al., filed Feb. 16, 1965, now abandoned.

This compound is useful as anti-bacterial and antifungicidal agents. For example, it is useful as disinfectant or sanitizer or it can be used in human or veterinary medicine as medicament especially in diseases caused by a wide variety of bacteria and fungi for which this compound has shown a high inhibitory effect. More particularly, the compound 2,3-dichlorophenyl 3-iodo-2-propynyl ether has exhibited unusual broad spectrum antibacterial activity of extremely high potency against both Gram-positive and Gram-negative bacteria for example, against *Streptococcus pyrogenes* 4, *Diplococcus pneumoniae* 6301, *Staphylococcus aurius* 209, *Escherichia coli* J and *Salmonella typhosa*.

In addition to the extraordinary activity against Grampositive and Gram-negative bacteria, this compound shows an inhibitory effect on a variety of fungi such as *Candida albicans*, *Tricophyton mentagrophytes*, *Microsporum audouini* and *aspergilli*. Of particular importance is the unexpectedly high activity against the fungi *Aspergillus niger*, *Aspergillus flavus* and *Aspergillus oryzae*. 2,3 - dichloro - 3 - iodo - 2 - propynyloxybenzene, when tested against *Aspergillus niger*, *Aspergillus flavus* and *Aspergillus oryzae* in a modified Czapek media, produced 100 percent inhibition of growth at less than 5.0 p.p.m. This activity renders the compound particularly useful as an additive for the prevention of mildew in such things as fibrous materials, leather, textiles, wood, paper and the like. In this particular aspect of the invention the compound can be utilized, for example, as an additive in paints where it has been found to have a total inhibitory effect on the above-mentioned fungi when used in amounts of 1 percent by weight or less.

Various concentrations of the compound were incorporated into a polyvinyl acetate latex paint and an outside linseed oil paint. The paints were brush-coated onto both sides of sheets of filter paper and air dried for 48 hours. One inch squares of the coated paper were placed on modified Czapek media in petri dishes, inoculated with a spore suspensions of *Aspergillus oryzae* and incubated for 7 days at 28–30° C. Results of these tests were as follows:

TABLE I

| Conc., Percent by weight of paint | Paint | Growth on Paint | Zone of Inhibition (mm.) |
|---|---|---|---|
| 2.0 | Latex | No growth | 5 |
| 1.0 | do | do | 1 |
| 0.5 | do | Trace | 0 |
| 0.25 | do | Moderate | 0 |
| Control | do | Heavy | 0 |
| 2.0 | Oil | No growth | 10 |
| 1.0 | do | do | 10 |
| 0.5 | do | do | 1 |
| Control | do | Moderate to heavy | 0 |

One inch squares of vegetable tanned leather were immersed in alcohol solutions of 2,3-dichlorophenyl 3-iodo-2-propynyl ether and air dried. The treated samples were placed on modified Czapek media, inoculated with a spore suspension of *Aspergillus niger* and incubated for 7 days at 28–30° C. Results were as follows:

TABLE II

| Conc., percent cmpd. in alcohol (wt./vol.) | Growth on Leather | Zone of Inhibition (mm.) |
|---|---|---|
| 0.5 | No growth | *10 |
| 0.2 | do | *10 |
| 0.1 | do | 10 |
| Control | Moderate growth | 0 |

*Complete inhibition of growth on agar.

This compound is useful as anti-bacterial and antifungal agent in preparations containing said compound in admixture with a pharmaceutical organic or inorganic carrier suitable for local administration. It can be used, for example, as contact disinfectants or sanitizers, or applied topically to affected areas. As carriers there are used substances which do not react with the new compounds, for example, gelatin, lactose, starch, talc, vegetable oils, polyethylene glycols and other known carriers for medicaments. The pharmaceutical preparations may be, for example, in the form of powders, sprays, salves, creams or suppositories or in liquid form as solutions, e.g., tinctures, suspensions or emulsions. If desired, they may be sterilized and/or may contain auxiliary substances such as preserving, stabilizing, wetting or emulsifying agents.

A conventional pharmaceutical formulation such as a cream, tincture or the like containing 2,3-dichlorophenyl 3-iodopropargyl ether in amounts of about 1 percent or less by weight of the total formulation provides an effective anti-bacterial/anti-fungal composition for the treatment of inflammatory conditions amenable to topical therapy. An exemplary ointment composition (Cream Base A) incorporating 2,3-dichloro-3-iodopropargyl ether as the active ingredient can be formulated as follows:

Stearic acid, light mineral oil, Span 60, Nipagin and Nipasol were placed in a suitable jacketed kettle, melted and heated to 70° C. 2,3-dichloro-3-iodopropargyl ether was then added with agitation. In a separate suitably jacketed kettle there was placed water, sorbitol and Tween 60 and the mixture heated to 70° C. The amounts of each of the various components are indicated in the table below.

Cream Base A | Percent
---|---
2,3-dichlorophenyl 3-iodo-2-propynyl ether | 1.02
Stearic acid | 13.50
Light mineral oil | 1.35
Span 60 | 2.25
Nipagin | 0.08
Niposal | 0.02
Sorbitol | 4.50
Tween 60 | 1.60
Distilled water q.s. 100. |
pH (approx.) | 5.1

The water phase was then added to the oil phase with agitation. The water was agitated for 5 minutes at 70° C. and then cooled to 50° and then cooled to room temperature with agitation. The ability of the above composition to inhibit various organisms in conventional microbiological tests is shown below.

The ointment preparation was dissolved in dimethylsulfoxide and diluted with water and incorporated into Sabouraud-Agar. At the desired concentration the agar was flooded with suspensions of Candida albicans and dermatophytes and incubated at 25° C. for 48 hours in the case of Candida and for 7 days in the case of dermatophytes. The minimum inhibitory concentrations (M.I.C.) are given in the following table.

TABLE III

Activity of ointments containing 2,3-dichlorophenyl 3-iodo-2-propynyl ether against bacteria and fungi in vitro Organism | M.I.C. ($\mu$g./ml.)
---|---
T. Mentagrophytes | 0.1
M. audouini | 0.1
C. albicans | 1.0

The ointment was tested by the agar-hole technique. Using a cork borer measuring 12.0 mm. in diameter, holes were cut in the center of an agar plate seeded with either bacteria or fungi and filled with the above ointment composition. Incubation for bacteria was 17° C. for 24 hours. Candida albicans was incubated at 25° C. for 48 hours while the dermatophytes were incubated at 25° C. for 7 days. The results of these experiments are expressed as zone inhibition and radius inhibition in the following table.

TABLE IV

Activity of ointments containing 2,3-dichlorophenyl 3-iodo-2-propynyl ether against bacteria and fungi in vitro Organism | Zone of inhibition (mm.)
---|---
S. aureus 209 | 43.0
E. coli J | 21.0
C. albicans | 62.0

Organism | Radius of inhibition (mm.)
---|---
S. pyogenes 4 | 3.0
D. pneumoniae 6301 | 3.0
S. aureus 209 | 14.0
E. coli J | 3.5
C. albicans | 24.0

This compound is accessible by a variety of methods. The novel ether compounds can, for example, be prepared by reacting the appropriate 2,3-dichlorophenol with 3-bromopropyne in the presence of anhydrous potassium carbonate, isolating the propynyl ether which forms and thereafter halogenating the acetylenic hydrogen for example by treatment with the appropriate halogen in the presence of a strong base, e.g., sodium hydroxide. Alternatively in the case of iodine, the terminal acetylenic carbon can be iodinated by first forming the copper salt by treating a solution of a copper ammonia complex and thereafter iodinating the copper salt, for example, by treating with a mixture of potassium iodide and iodine. The above reaction can be suitably carried out in an inert organic solvent such as alcohol, acetone and the like. The reactions can be conveniently carried out at room temperature or above or below room temperature. However, it is preferred to operate at a temperature between about 0° C. and about 30° C. The end product can be readily recovered by any of the usual techniques such as filtration, evaporation, etc.

Alternatively this compound can be prepared by directly condensing a 1,3-dichlorophenol with 2,3-dihalophenol. The condensation is suitably carried out in an inert organic solvent in the presence of a base. The reaction temperature is not critical though it is preferred to operate at an elevated temperature suitably at the reflux temperature of the reaction mixture.

EXAMPLE 1

Preparation of 2,3-dichlorophenyl 3-iodo-2-propynyl ether

To a 2-liter 3-neck round bottom flask equipped with a stirrer and a reflux condenser were charged 200 g. (1.2 moles) of 2,3-dichlorophenol, 160 g. (1.3 moles) of 3-bromopropyne, 186 g. (1.3 moles) of anhydrous potassium carbonate and 1.0 liter of pure acetone. After the reaction mixture was stirred and refluxed for 8 hours, it was cooled to room temperature. The solids were filtered and washed well with 500 ml. of acetone. The solvent was evaporated at 60° in vacuo and the residue was dissolved in 700 ml. of ethanol. The crystals which formed on chilling in an ice-water bath were filtered and washed well with 500 cc. of water. After drying 48 hours in a vacuum desiccator with anhydrous calcium chloride as the desiccant there was obtained 2,3-dichlorophenyl 2-propynyl ether, M.P. 47–49° C.

To a 1 liter 3-neck round bottom flask equipped with a stirrer, a dropping funnel and a thermometer were charged 28.8 g. (0.14 mole) of 2,3-dichlorophenyl 2-propynl ether prepares as above and 300 ml. of pure methanol. To the vigorously stirred solution were added simultaneously 48 g. (0.20 mole) of iodine in small portions and 180 ml. of a 10 percent aqueous sodium hydroxide solution (0.45 mole) dropwise over a period of 15 minutes while the reaction temperature was kept at 20–25° by means of an ice-water bath. After stirring for 30 minutes longer at room temperature, the resulting precipitate was filtered and washed well with 200 ml. of water. The solids were dried 24 hours in a vacuum desiccator with anhydrous calcium chloride as the desiccant to give 2,3-dichlorophenyl 3-iodo-2-propynyl ether, M.P. 58–59°.

We claim:
1. 2,3-dichlorophenyl-3-iodo-2-propynyl ether.

References Cited

UNITED STATES PATENTS 2,942,014 | 6/1960 | Cameron | 260—612
---|---|---|---
2,993,934 | 7/1961 | Rosen | 260—612
3,322,813 | 5/1967 | Seki et al. |

OTHER REFERENCES

Hatch et al.: Jour. Org. Chem., vol. 23 (1958), pp. 397–401.

BERNARD HELFIN, Primary Examiner

U.S. Cl. X.R.

117—138.5; 260—999; 424—340